United States Patent
Sand et al.

[11] Patent Number: 5,835,737
[45] Date of Patent: *Nov. 10, 1998

[54] METHOD AND APPARATUS FOR ARBITRATING ACCESS TO SELECTED COMPUTER SYSTEM DEVICES

[75] Inventors: Jonathan Sand, Boulder Creek; Carl Sutton, Palo Alto; Holly Knight, La Honda, all of Calif.

[73] Assignee: Apple Computer, Inc., Cupertino, Calif.

[*] Notice: This patent issued on a continued prosecution application filed under 37 CFR 1.53(d), and is subject to the twenty year patent term provisions of 35 U.S.C. 154(a)(2).

[21] Appl. No.: 644,705

[22] Filed: May 10, 1996

[51] Int. Cl.$^6$ ........................................... G06F 13/14
[52] U.S. Cl. ................................................ 395/293
[58] Field of Search ................... 395/293, 287, 395/728, 729

[56] References Cited

U.S. PATENT DOCUMENTS

| | | | |
|---|---|---|---|
| 5,519,838 | 5/1996 | Ziegler et al. | 395/299 |
| 5,574,867 | 11/1996 | Khaira | 395/293 |

FOREIGN PATENT DOCUMENTS

| | | | |
|---|---|---|---|
| 0590645A1 | 4/1994 | European Pat. Off. | G06F 12/02 |
| 0650120A2 | 4/1995 | European Pat. Off. | G06F 9/445 |
| WO9411812A1 | 5/1994 | WIPO | G06F 9/445 |

*Primary Examiner*—Glenn A. Auve
*Attorney, Agent, or Firm*—Carr & Ferrell LLP; Gregory J. Koerner

[57] ABSTRACT

A method and apparatus for arbitrating access to a selected device in a computer system comprises a routine for registering access rules for accessing the selected system device, a plurality of competing clients which may each request a connection to the selected device, and an arbitrator which uses the registered access rules to negotiate access to the requested connection on behalf of the competing clients.

20 Claims, 9 Drawing Sheets

METHOD AND APPARATUS FOR ARBITRATING ACCESS TO SELECTED COMPUTER SYSTEM DEVICES

BACKGROUND OF THE INVENTION

1. Field of the Invention

This invention relates generally to computer operating systems and relates more particularly to a method and apparatus for arbitrating access to selected computer system devices.

2. Description of the Prior Art

Computer efficiency and user-friendliness are important considerations affecting both system developers and system users. As modern computers are used to perform an increasing number of tasks and functions, the need for efficient and user-friendly access to various system components and devices becomes more critical. A more efficient computer system will generally produce a larger volume of computer workproduct and thereby result in significant economic benefits for both the system developer and the system user. Likewise, increased computer user-friendliness will allow computer users to save time and work more efficiently, thus increasing the quantity and quality of their computer workproduct.

Computer systems frequently require various specialized system devices to perform selected operations and functions. For example, a given system component may variously require access to an input/output (I/O) device (e.g., video display or keyboard), a memory device (e.g., non-volatile RAM), or various other system devices (e.g., the system clock). When a given system component gains access to a selected device, the system component in effect becomes a "client" of the accessed device.

A significant problem can potentially arise whenever two different clients simultaneously seek or require access to the same device. Conventional computer operating systems typically do not arbitrate access to a system device in the event of multiple competing clients. Two clients competing for access to a single device may thus be totally unaware of each other and of their conflicting need for access. The device may responsively generate confusing errors or lock the system.

For example, if a networking client is using a serial port device to communicate on the Internet and subsequently, a file system client seeks access to the same serial port device to copy a file to another computer system, special device-specific code must be written. In contrast, an operating system which provides a central facility for arbitrating access to a device could generate a dialog box to ask the system user whether to reconfigure the system. The lack of access arbitration in conventional computer operating systems thus results in a lowered level of efficiency and user-friendliness. Therefore, an improved method and apparatus is needed for arbitrating access to computer system devices according to the present invention.

SUMMARY OF THE INVENTION

In accordance with the present invention, a method and apparatus are disclosed for arbitrating access to computer system devices. In the preferred embodiment of the present invention, several system components or "clients" may seek access to a selected system device by obtaining an active connection to an access point contained within a specific related family component. Each family component also has a number of associated plug-in components and each plug-in component typically performs an ownership role towards a selected system device. The present invention features a separate component called arbitration services. In the preferred embodiment, a family provides arbitration services with rules for accessing the selected system device.

In practice, a client requests a connection to a chosen family access point which corresponds with the desired system device. Arbitration services then creates a dormant connection and attempts to eliminate any competing connections to the selected system device. Arbitration services examines each competing connection by applying access rules and determines whether the competing connection can be eliminated. If any competing connections cannot be eliminated, then arbitration services notifies the requesting client that the connection remains dormant. However, if all competing connections can be eliminated, then arbitration services upgrades the state of the connection from dormant to active and notifies the requesting client that the connection is now active and that the client now has access to the selected device.

The present invention permits a computer system to handle device-access conflicts in a more efficient manner by registering access rules and using the access rules to arbitrate access to selected devices. The present invention thus provides an improved method and apparatus for arbitrating access to the computer system devices.

DETAILED DESCRIPTION OF THE PREFERRED EMBODIMENT

The present invention includes a method and apparatus for arbitrating access to selected computer system devices. According to the present invention, multiple system clients may seek simultaneous access to a selected system device. To arbitrate access between the competing system clients, arbitration services receives connection information and, based upon this information, determines which system client should receive access to the selected device.

Figure 1:
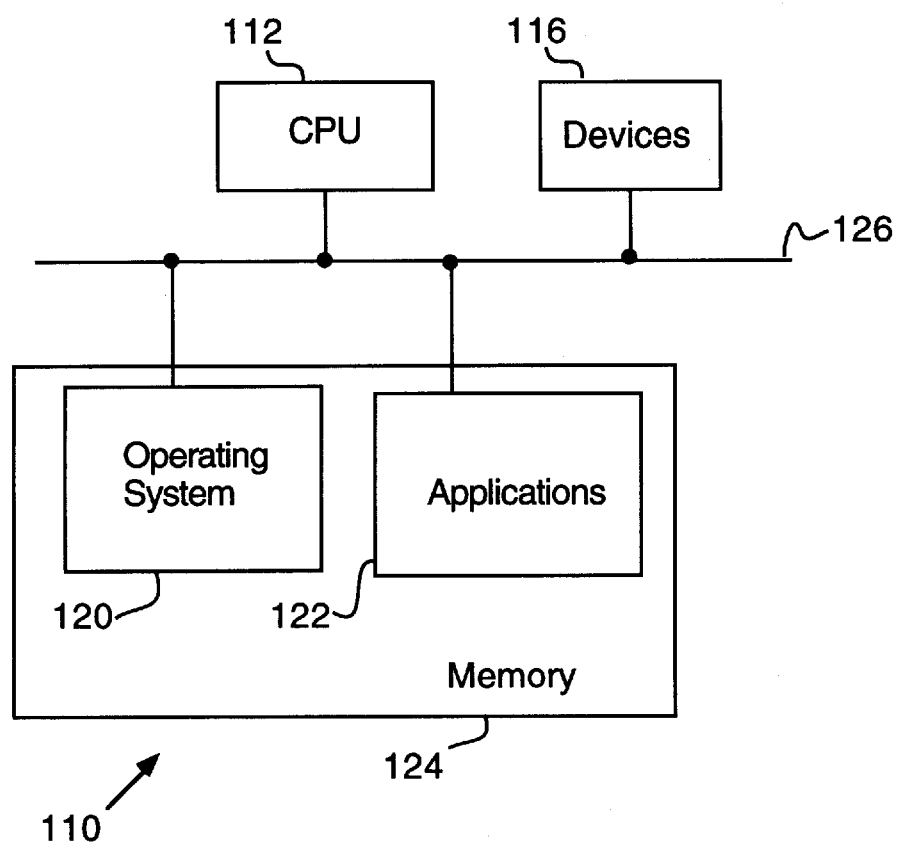
FIG. 1 is a block diagram showing a computer system for arbitrating access to selected devices according to the present invention.

Referring now to FIG. 1, a computer system 110 is shown for arbitrating access to selected devices according to the present invention. Computer system 110 preferably comprises a central processing unit (CPU) 112, various system devices 116, and a memory 124. Memory 124 contains an operating system 120 and at least one application program 122. Each element of computer system 110 preferably has an input and an output coupled to a common system bus 126. Memory 124 may alternately comprise various storage-device configurations, including Random-Access-Memory (RAM) and Read-Only-Memory (ROM). System devices 116 may include various system 110 components, such as input/output (I/O) devices (e.g., keyboards, video monitors and communications devices), memory devices (e.g., non-volatile RAM) and other system devices (e.g., the system 110 clock). The preferred embodiment may also include more abstract entities such as a disk partition or a RAM disk.

Figure 2:
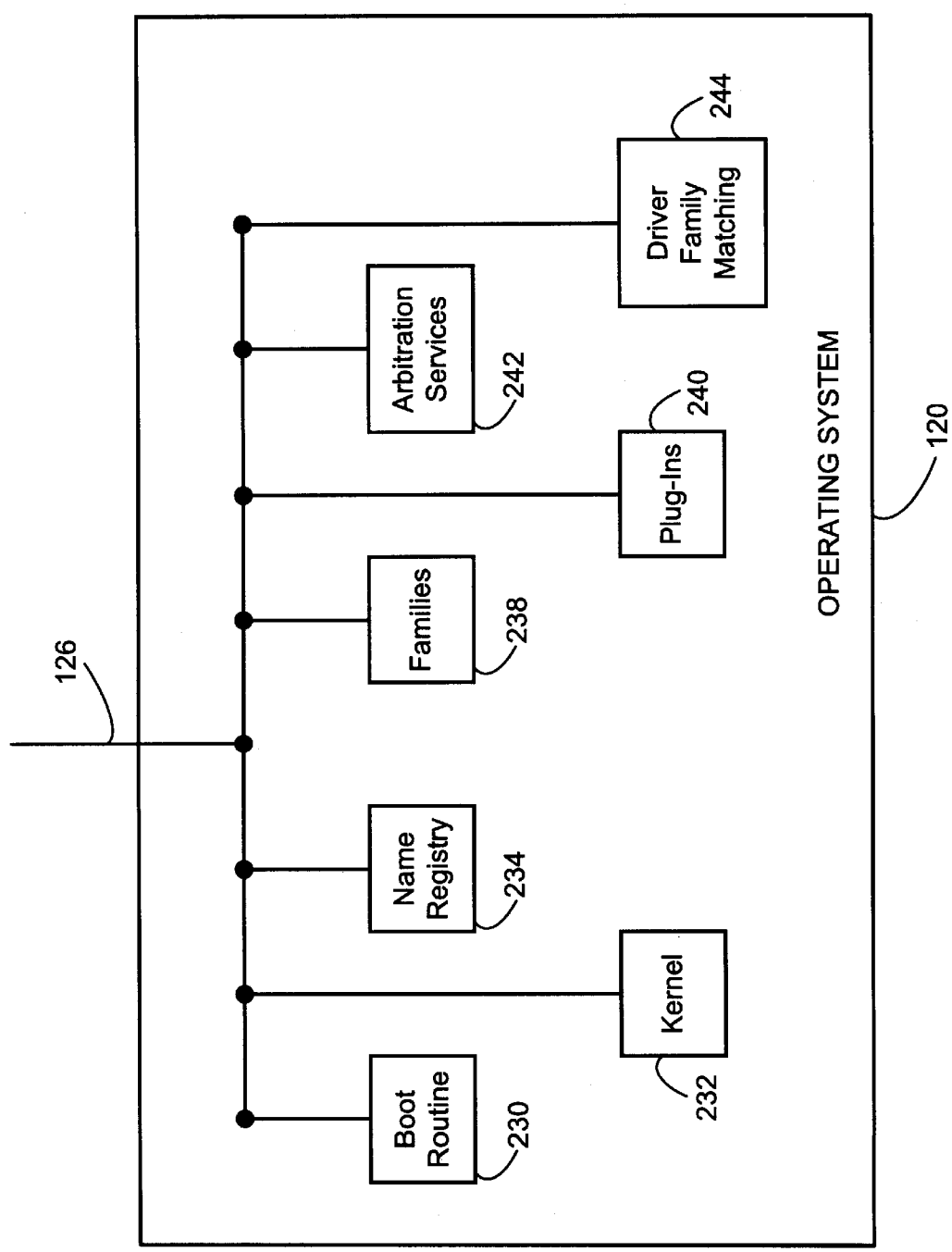
FIG. 2 is a block diagram showing the preferred embodiment of the FIG. 1 operating system.

Referring now to FIG. 2, a block diagram of the preferred embodiment of operating system 120 is shown. Operating system 120 includes boot routine 230, kernel 232, name registry 234, families 238, plug-ins 240, arbitration services 242 and driver family matching 244. Boot routine 230 performs a start-up procedure which places computer system 110 into an initial operational state wherein system 110 is ready to begin normal computer operations. Once system 110 has entered this initial operational state, boot routine 230 then transfers control to kernel 232 which completes the boot cycle and transfers control to driver family matching 244. Driver family matching 244 is discussed in U.S. patent application Ser. No. 08/435,677, entitled "Method And Apparatus For Handling I/O Requests," filed on May 5, 1995, U.S. patent application Ser. No. 08/435,676, entitled "Dynamic Device Matching Using Driver Candidate List," filed on May 5, 1995 (now U.S. Pat. No. 5,630,079), and U.S. patent application Ser. No. 08/648,305, entitled "Dynamic Device Matching Using Driver Candidate List," filed on May 2, 1996, which are each hereby incorporated by reference. Name registry 234 is a naming service that is used by system components (including driver family matching 244, families 238 and plug-ins 240) to store and look up information about devices 116.

Families 238 are components that manage specific input/output-related activities. Examples include the display family and the block storage family. Plug-ins 240 are dynamically-loaded components which manage specific devices 116 or specific system resources provided by a given family 238. For example, the block storage family 238 may employ various media-specific plug-ins 240 which each correspond to a particular storage medium or device (e.g., a hard disk driver or a CD-ROM driver). Arbitration services 242 is a component used by the present invention to manage access to selected devices 116 and is further discussed in conjunction with FIGS. 3–9 below. Driver family matching 244 provides each family 238 with a list of devices 116 and their associated plug-ins 240, whereby each family 238 may then select the most suitable plug-in 240 for each device 116. A family 238 may then acquire ownership over a selected device 116 on behalf of a selected plug-in 240.

Figure 3:
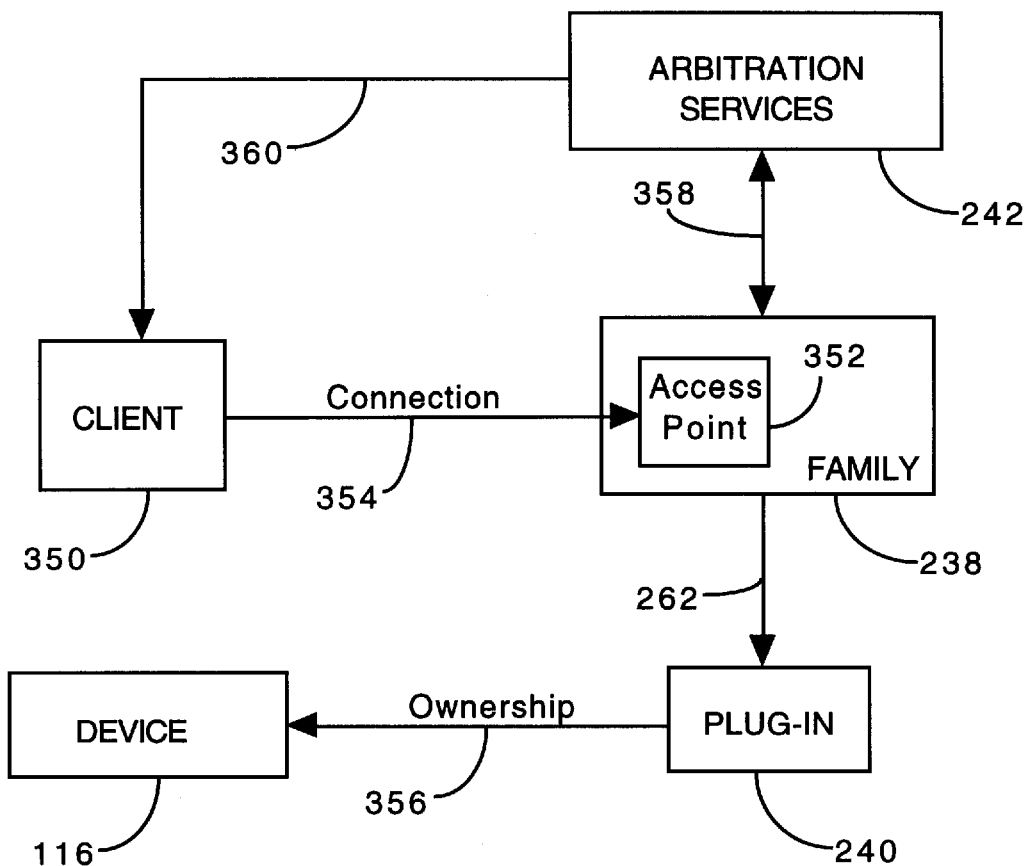
FIG. 3 is a block diagram showing an operational model of the preferred embodiment of the present invention.

Referring now to FIG. 3, a block diagram of an operational model of the present invention is shown. Client 350 may include any component which requires or requests access to a selected system device 116. In the preferred embodiment, client 350 may include applications 122 and plug-ins 240 (e.g., block storage, keyboard, Ethernet, and displays). FIG. 3 illustrates the granting of access between client 350 and device 116. However, as the block diagram illustrates, the present invention establishes an indirect rather than a direct connection between client 350 and system device 116.

As discussed above, family 238 acquires ownership 356 of device 116 on behalf of an appropriate related plug-in 240. Family 238 also contains a number of different access points 352 which each represents a discrete plug-in 240. Access points 352 are provided by families 238 as points to which clients 350 may connect to establish access to a corresponding device 116. Family 238 registers each access point 352 in order to assign each a unique identifier as well as to specify access rules such as available connection types and connection sharing rules.

Client 350 requests family 238 to establish a connection 354 to access point 352. Along with the connection 354 request, client 350 may specify a number of different request options which instruct arbitration services how to form requested connection 354 and will also govern arbitration services 242 in future handling of requested connection 354. In the preferred embodiment, a connection 354 can be requested to be "non-yielding", which means that all subsequent connection 354 requests to this particular access point 352 will fail to replace the "non-yielding" connection 354. Connection 354 can also be requested to be "yielding", which means that all subsequent connection 354 requests to this particular access point 352 will succeed in replacing the "yielding" connection. A client 350 typically requests a non-yielding connection whenever interruption of an active connection 354 is deemed to be an impermissible occurrence.

In the preferred embodiment, the request for connection 354 is always granted, however connection 354 is created in a dormant state (which is not useable until connection 354 is upgraded from the dormant state to an active state). Connection 354 remains unusable until arbitration services 242 notifies client 350, preferably via line 360, that connection 354 is active. Once connection 354 is active, client 350 can then access device 116 through family 238 and plug-in 240.

The present invention may also be used in implementations which require "extended arbitration" throughout a network of connections. For example, other "tiers" of additional clients may seek access to device 116 through client 350, providing that client 350 contains the requisite access points 352. For example, an application 122 may request access to client 350 which already has an active connection to access point 352 in family 238. If a competing client 116 (which is not part of the tiered client structure) subsequently also seeks access to device 116, then an "extended arbitration" takes place in which arbitration services 242 examines each tier of connected clients between the topmost tier and device 116 and sequentially determines whether to relinquish the connection 354 for each individual tier of the connected clients. The connection requests and responses must thus be passed up and down the tiers of connections to collectively arbitrate access to the selected device 116.

Figure 4:
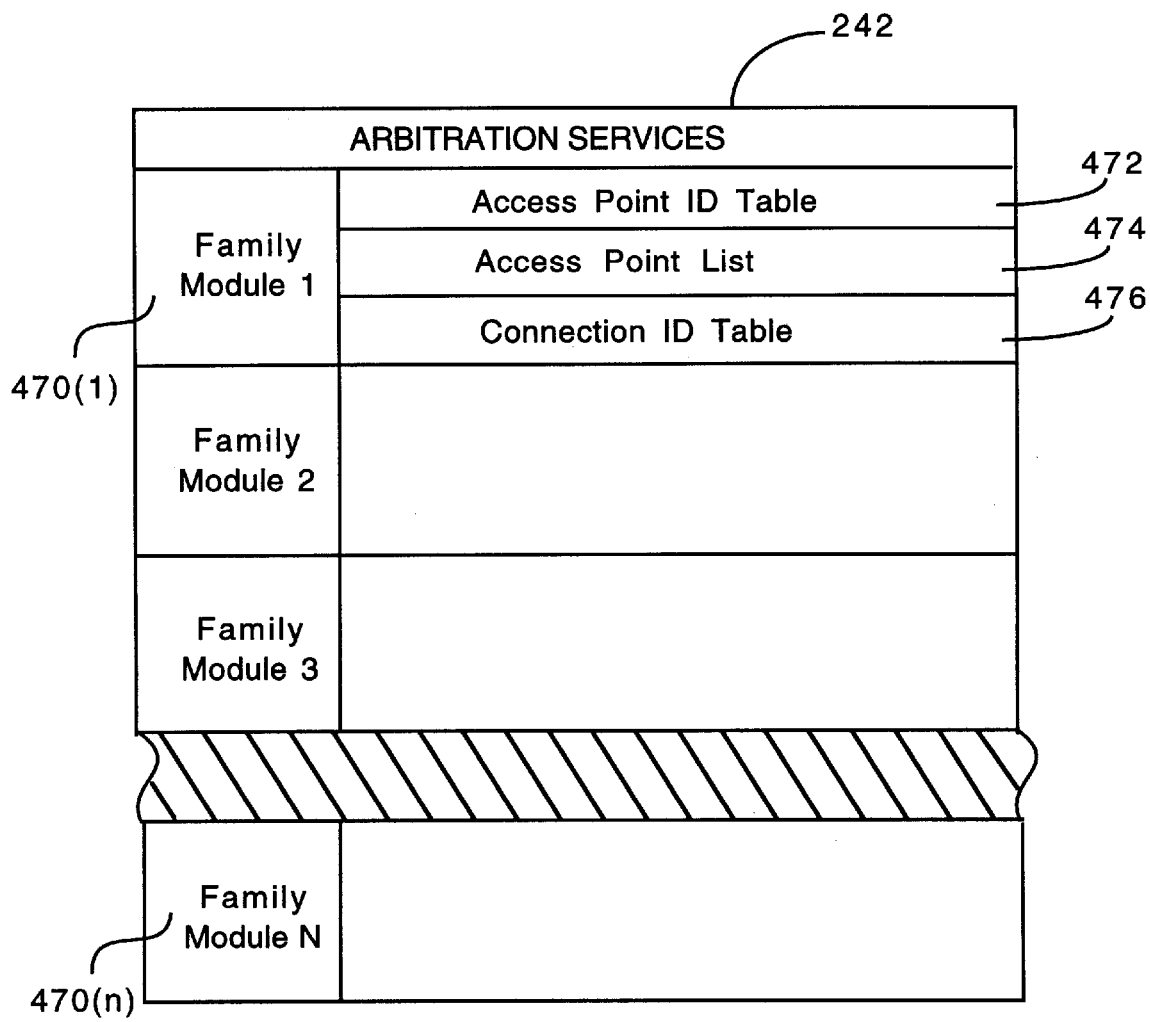
FIG. 4 is a block diagram showing the preferred embodiment of the arbitration services of the present invention.

Referring now to FIG. 4, a block diagram mapping the preferred embodiment of arbitration services 242 is shown. In the preferred embodiment, arbitration services 242 typically includes a number of family modules 470(I) through 470(n) which each correspond to a respective family 238. Each family module 470(I) through 470(n) includes an access point ID table 472, an access point list 474 and a connection ID table 476.

Access point ID table 472 contains a pool of assigned identifiers each corresponding to a different access point 352 from a specific family 238 and also contains a pool of available unassigned identifiers. Access point list 474 is a list of modules which each correspond to an access point 352 and each module contains access information for the corresponding access point 352. Connection ID table 476 is a pool of identifiers for all possible connections 354 in a particular family 238.

Figure 5:
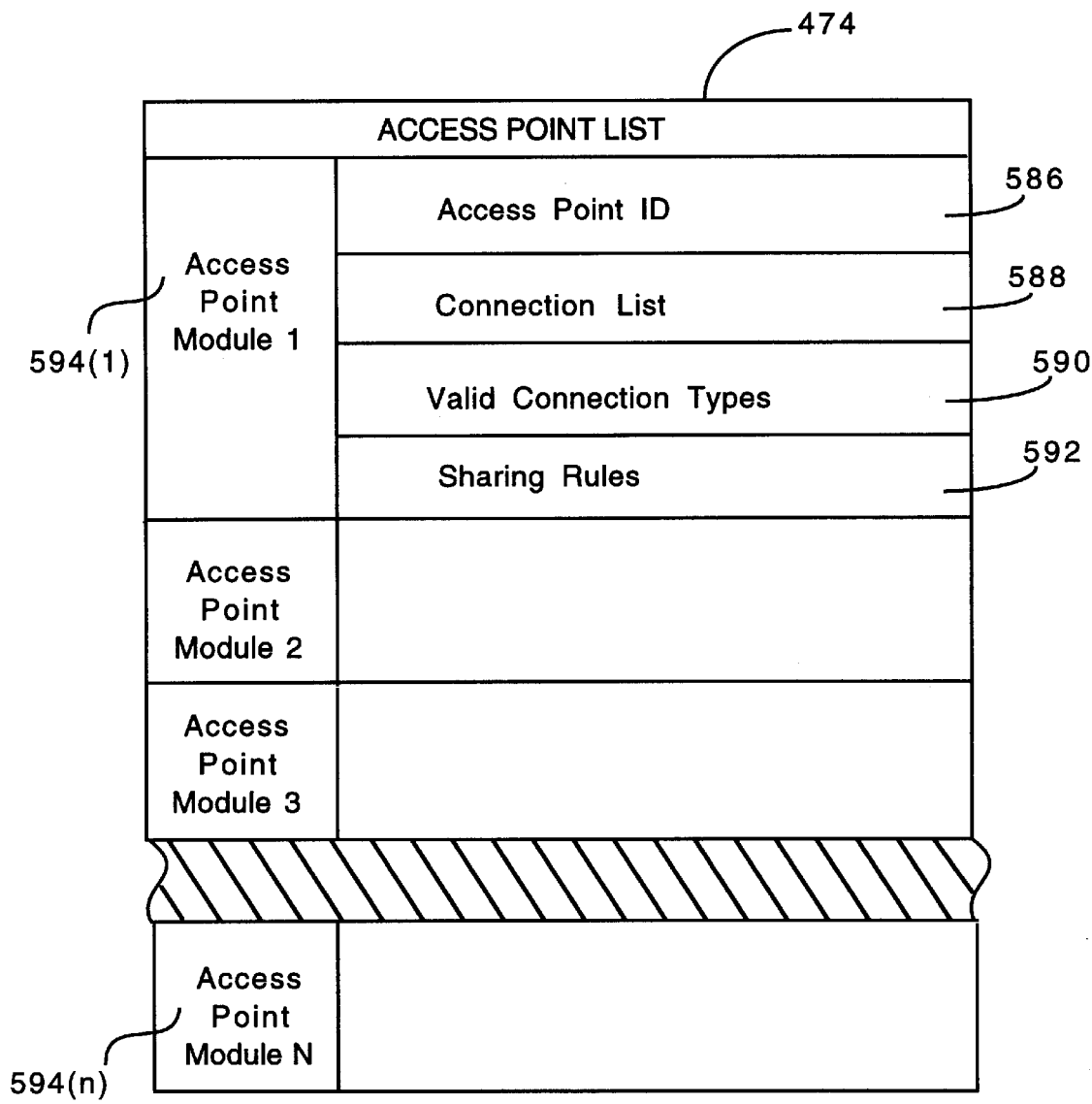
FIG. 5 is a block diagram showing the preferred embodiment of the access point list of the present invention.

Referring now to FIG. 5, a block diagram of the preferred embodiment of access point list 474 is shown. In the preferred embodiment, access point list 474 contains access point modules 594(l) through 594(n) which each correspond to a specific access point 352 that has been created by a particular family 238. Access point modules 594(l) through 594(n) each include an access point ID 586, a connection list 588, valid connection types 590, and sharing rules 592.

Access point ID 586 is an identifier which designates a corresponding access point 352. A family 238 acquires an access point ID 586 for each access point 352 via a registration call to arbitration services 242. These access point IDs 586 are advertised to clients 350 by family 238 iteration functions. Connection list 588 contains modules each corresponding to a connection 354 to the related access point 352. The connections 354 in connection list 588 may be either dormant (created, but not useable) or active (useable).

Valid connection types 590 are the only connections 354 permitted for the related access point 352 and are specified by the particular family 238 to which the related access point 352 belongs. Sharing rules 592 include pairs of compatible connection 354 types for a designated access point 352. Valid connection types 590 and sharing rules 592 can be different for each access point 352 (even within the same family 238).

Figure 6:
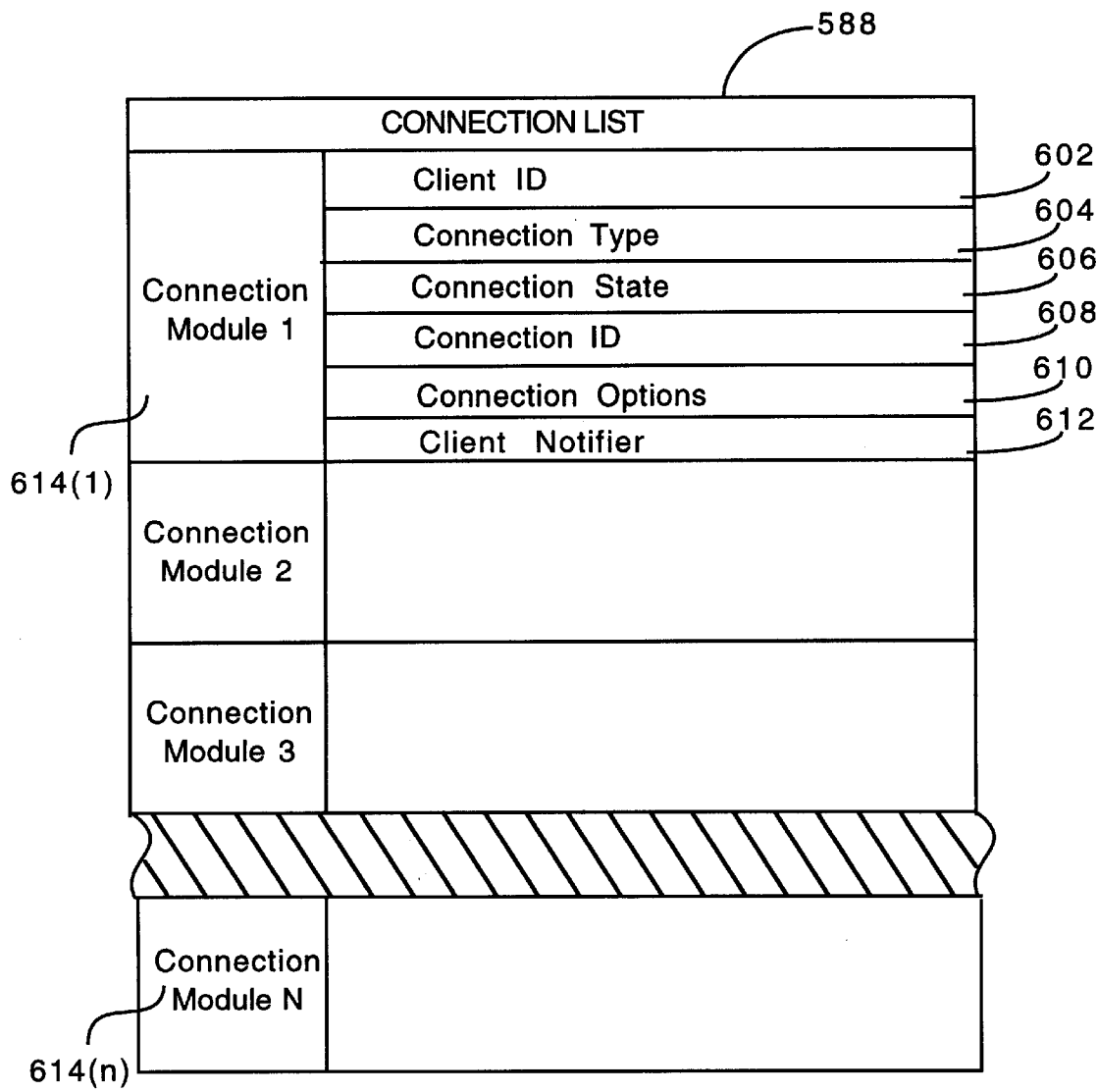
FIG. 6 is a block diagram showing the preferred embodiment of the connection list of the present invention.

Referring now to FIG. 6, a block diagram of the preferred embodiment of connection list 588 is shown. In the preferred embodiment, each connection module 614(l) through 614(n) includes client ID 602, connection type 604, connection state 606, connection ID 608, connection options 610 and client notifier 612.

Client ID 602 is an identifier which designates the particular client 350 that requested connection 354. Connection type 604 specifies the particular kind of connection 354 that client 350 requested to access point 352. Connection state 606 designates whether connection 354 is dormant or active. Connection ID 608 is an identifier which corresponds to related connection 354 and which is assigned by arbitration services 242 when connection 354 is created.

Connection options 610 tell arbitration services 242 how to process a connection 354 request when the particular requested connection 354 is already in use and also how to initially create the requested connection 354. In the preferred embodiment, a client 350 specifies connection options 610 whenever a connection 354 is requested. For example, connection options 610 may include, but are not limited to, a "yielding" option, a "non-yielding" option, a "demand" option, and a "borrow" option. "Yielding" means that subsequent requests for a connection 354 will succeed. "Non-yielding" means that subsequent requests for a connection 354 will fail. "Demand" tells arbitration services 242 not to request release, but to simply notify the prior client 350 that connection 354 was demanded and taken away. "Borrow" means that a prior "loaning" client can expect to reacquire connection 354 whenever a second "borrowing" client terminates use of "borrowed" access point 352. Client notifier 612 is a message identifier used by arbitration services to contact and communicate with respective specified clients 350. For example, if a dormant connection 354 is activated, arbitration services 242 may notify client 350 via client notifier 612.

Figure 7:
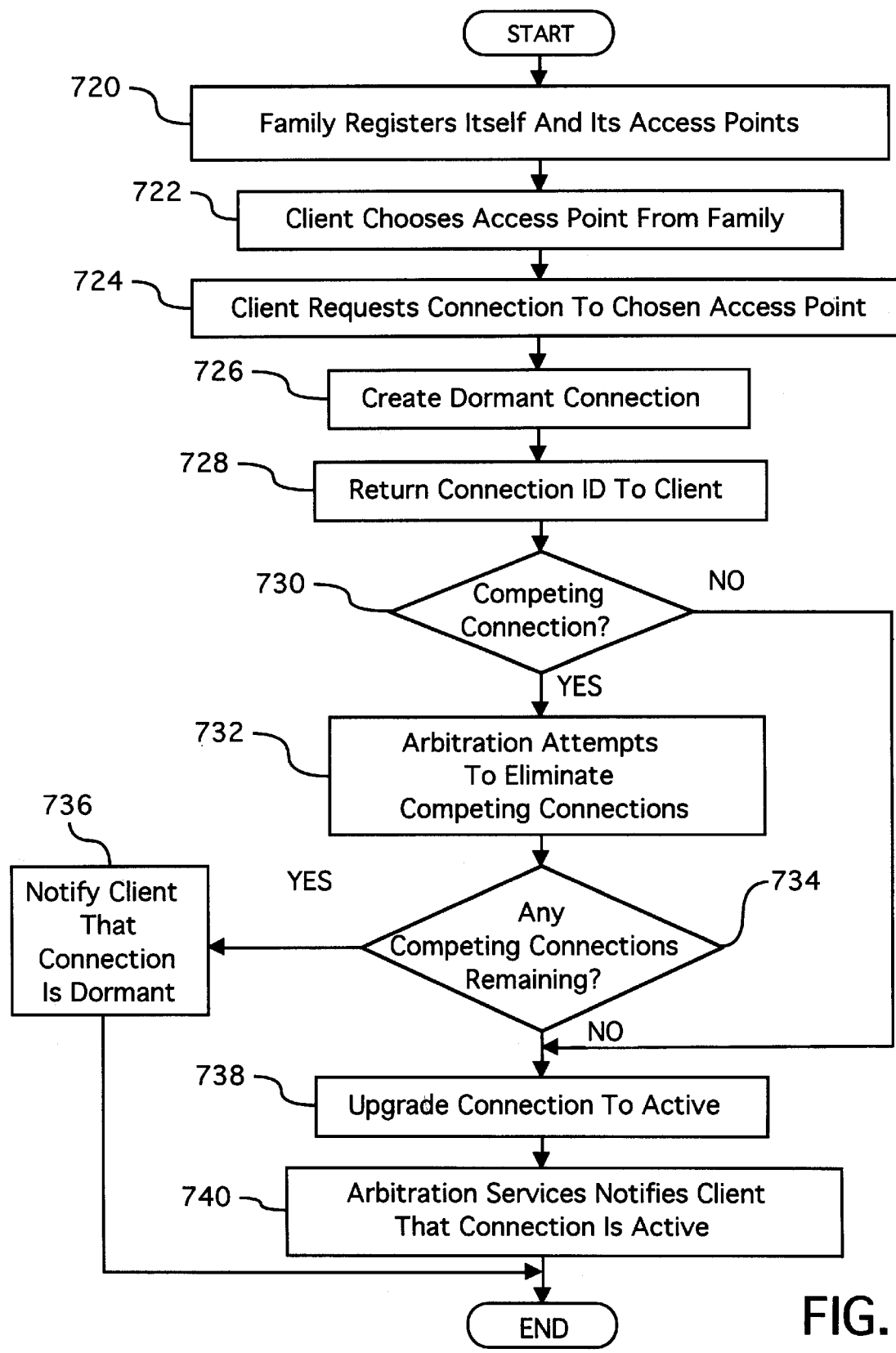
FIG. 7 is a flowchart showing method steps for arbitrating access to a computer system device according to the present invention.

Referring now to FIG. 7, a flowchart of method steps for arbitrating access to a selected system device 116 is shown. In the preferred embodiment, the FIG. 7 process begins in step 720 when a family 238 registers itself and each of its related access points 352 with arbitration services 242. The registration information is contained in a corresponding family module 470 within arbitration services 242. In step 722, client 350 then chooses the access point 352 which corresponds to the desired selected device 116. Next, client 350 requests, in step 724, a connection 354 to the chosen access point 352.

In step 726, family 238 creates a dormant connection 354 between client 350 and the chosen access point 352. In step 728, arbitration services 242 returns a connection identifier 608 to client 350. Arbitration services 242 then determines, in step 730, whether one or more competing connections 354 exist. Step 730 is further discussed in conjunction with FIG. 8. If no competing connections 354 exist, then, in step 740, arbitration services 242 notifies client 350 that connection 354 is active and the FIG. 7 procedure ends.

However, if at least one competing connection 354 does exist in step 730, then, in step 732, arbitration services 242 attempts to eliminate the competing connections 354. Step 732 is further discussed in conjunction with FIG. 9. Arbitration services 242 then determines, in step 734, whether any competing connections 354 remain. If competing connections 354 remain, then arbitration services 242 notifies client 350, in step 736, that connection 354 is dormant. However, if no competing connections 354 remain, family 238 upgrades connection 354 to an active state in step 738 and arbitration services 242 notifies client 350 in step 740 that connection 354 is active.

Figure 8:
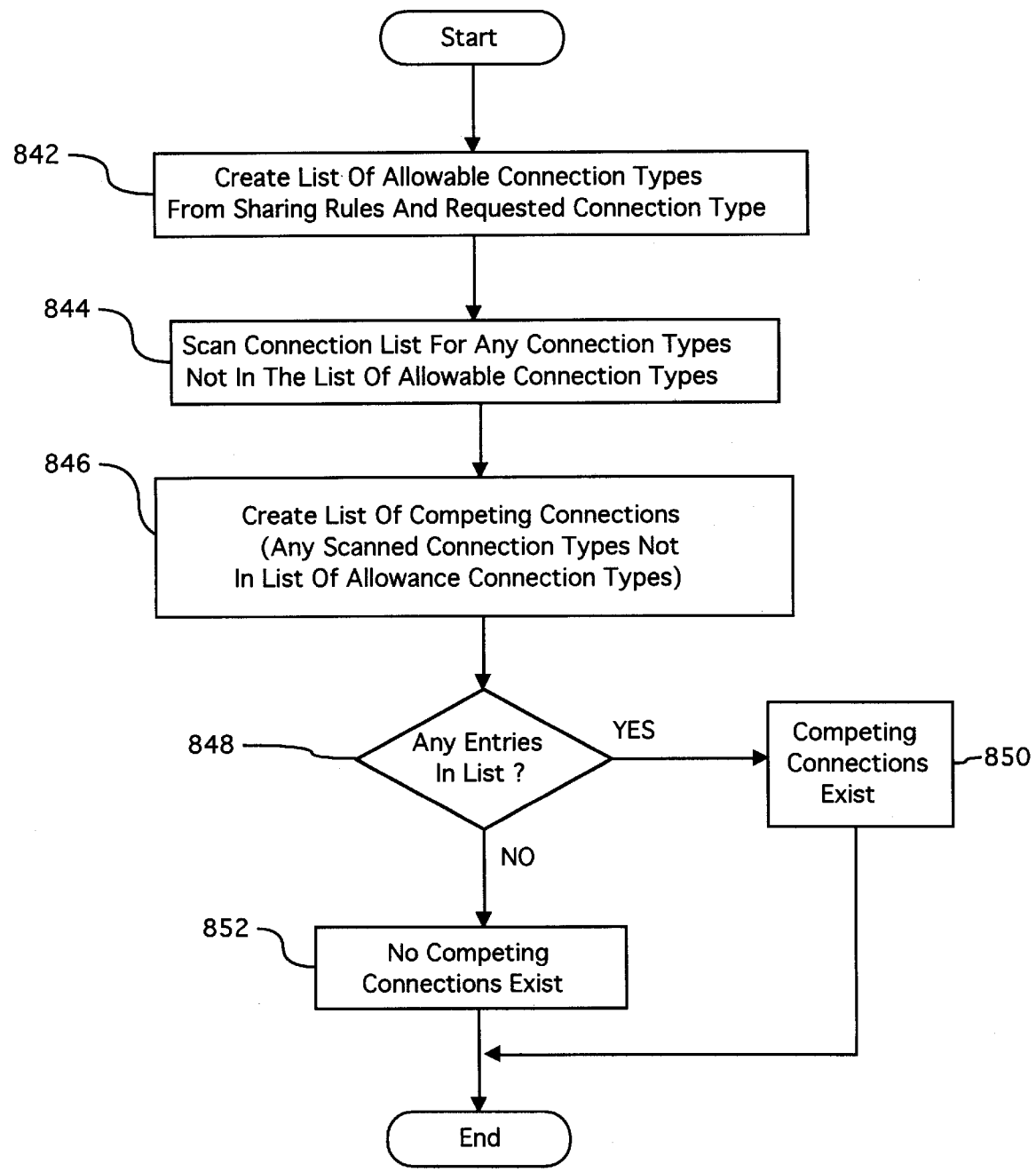
FIG. 8 is a flowchart showing method steps for determining the existence of competing connections according to the present invention.

Referring now to FIG. 8, a flowchart of method steps for determining the existence of competing connections 354 is shown. In the preferred embodiment, the FIG. 8 process begins in step 842 when arbitration services 242 creates a list of allowable connection types based on sharing rules 592 and the connection type 604 registered by family 238 for access point 352. In step 844, arbitration services 242 then scans the connection list 588 for any connection types 604 which are not in the list of allowed connection types. In step 846, arbitration services 242 creates a list of competing connections 354 containing any scanned connection types which are not in the list of allowed connection types 590. In step 848, arbitration services 242 then evaluates whether there are any entries in the list of competing connections 354. If there are entries, then, in step 850, arbitration services 242 determines that competing connections 354 exist. If there are no entries, then, in step 852, arbitration services 242 determines that no competing connections 354 exist.

Figure 9:
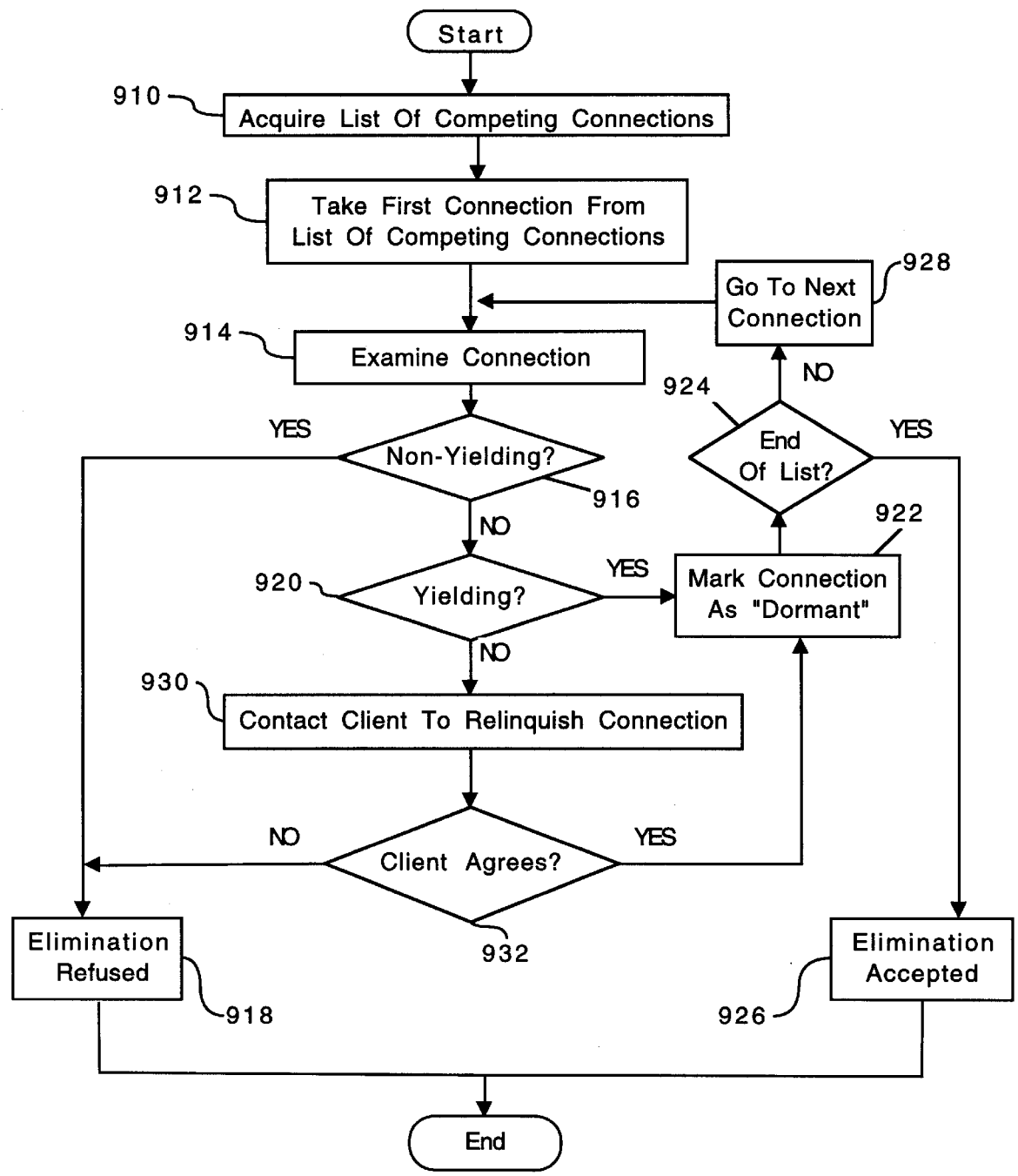
FIG. 9 is a flowchart showing method steps for attempting to eliminate competing connections according to the present invention.

Referring now to FIG. 9, a flowchart of method steps for attempting to eliminate competing connections 354 is shown. In the preferred embodiment, the FIG. 9 process begins in step 910 when arbitration services 242 acquires the list of competing connections 354. In step 912, arbitration services 242 then takes the first connection 354 from the list. In step 914, arbitration services 242 examines connection 354. In the preferred embodiment, arbitration services 242 examines connection options 610 in step 916 to determine whether the competing connection 354 is "non-yielding". If competing connection 354 is non-yielding, then, in step 918, arbitration services 242 determines that elimination is refused.

However, if competing connection is not non-yielding, then arbitration services 242 determines, in step 920, whether competing connection 354 is "yielding". If competing connection 354 is yielding, then, in step 922, arbitration services 242 marks the connection 354 as "dormant". In the preferred embodiment, connection 354 is initially marked as "going dormant" and subsequently, connection 354 is upgraded to a fully "dormant" state to complete the connection 354 marking procedure. In this way, connection 354 goes to a fully dormant state only after any data in connection 354 reaches its destination (typically, either client 350 or device 116).

In step 924, arbitration services 242 then determines whether any entries remain on the list of competing connections 354. If no further entries remain, arbitration services 242 determines, in step 926, that elimination of the competing connection 354 is accepted. However, if entries remain on the list of competing connections 354, then arbitration services 242 goes, in step 928, to the next listed connection 354 and repeats the foregoing examination procedure for each additional entry.

In steps 916 and 920, if arbitration services 242 determines that competing connection 354 is neither non-yielding nor yielding, then, in step 930, arbitration services 242 contacts client 350 to relinquish connection 354. If client 350 does not agree to relinquish connection 354 in step 932, then, in step 918, arbitration services 242 determines that elimination of competing connection 354 is refused. However, if client 350 agrees to relinquish connection 354 in step 932, then, in step 922, arbitration services 242 marks the connection 354 as dormant. Then, as described above, arbitration services 242 determine, in step 924, whether any entries remain on the list of competing connect 354. If no further entries remain, arbitration services 242 determines, in step 926, that elimination of the competing connection 354 is accepted. However, if entries remain on the list of competing connections 354, then, in step 928, arbitration services 242 goes to the next listed connection 354 and repeats the foregoing examination procedure for each additional entry.

The invention has been explained above with reference to a preferred embodiment. Other embodiments will be apparent to those skilled in the art in light of this disclosure. For example, arbitration services 242 may use various other criteria to attempt to eliminate competing connections 354 and the present invention is thus not limited to those examples described in the preferred embodiment. Therefore, these and other variations upon the preferred embodiments are intended to be covered by the present invention, which is limited only by the appended claims.

What is claimed is:

1. An apparatus for arbitrating access to a selected device in a computer system, comprising:
    a routine for registering connection rules for accessing said selected device;
    a plurality of competing system clients each requesting a connection to said selected device; and
    an arbitrator for granting said connection to selected ones of said plurality of competing system clients based upon said registered connection rule, said arbitrator being configured to distinguish between and among a plurality of connection options specified by said plurality of competing system clients and to grant said connection in accordance with the specified connection options.

2. The apparatus of claim 1 wherein said connection rules specify whether said selected ones of said plurality of competing system clients will relinquish said connection when requested.

3. The apparatus of claim 1 wherein said connection is always initially created in a dormant state and then is subsequently upgraded to an active state whenever said arbitrator grants said connection.

4. The apparatus of claim 1 wherein said arbitrator notifies said selected ones of said plurality of competing system clients whenever said connection is granted.

5. A method for arbitrating access to a selected system device in a computer system, comprising the steps of:
    registering connection rules for accessing said selected device;
    requesting a connection to said selected device for a plurality of competing system clients; and
    granting said connection to one or more of said plurality of competing system clients based upon said registered connection rules, wherein said granting step includes distinguishing between and among a plurality of specified connection options and granting said connection in accordance therewith.

6. The method of claim 5 wherein said connection rules specify whether said one or more of said plurality of competing system clients will relinquish said connection when requested.

7. The method of claim 5 wherein said connection is initially created in a dormant state and then is subsequently upgraded to an active state whenever said arbitrator grants said connection.

8. The method of claim 6 further comprising the step of notifying said one or more of said plurality of competing system clients whenever said connection is granted.

9. A computer-readable medium containing instructions which cause a computer system to arbitrate access to a selected device by performing the steps of:
    registering connection rules for accessing said selected device;
    requesting a connection to said selected device for a plurality of competing system clients; and
    granting said connection to one or more of said plurality of competing system clients based upon said registered connection rules, wherein said granting step includes distinguishing between and among a plurality of specified connection options and granting said connection in accordance therewith.

10. The computer-readable medium of claim 9 wherein said connection rules specify whether said one or more of said plurality of competing system clients will relinquish said connection when requested.

11. The computer-readable medium of claim 9 wherein said connection is initially created in a dormant state and then is subsequently upgraded to an active state whenever said arbitrator grants said connection.

12. The computer-readable medium of claim 9 further comprising the step of notifying said one or more of said plurality of competing system clients whenever said connection is granted.

13. An apparatus for arbitrating access to selected computer system devices, comprising:
    means for registering connection rules for accessing said selected device;
    means for requesting a connection to said selected device for a plurality of competing system clients; and; and
    means for granting said connection to one or more of said plurality of competing system clients based upon said registered connection rules, said means for granting said connection being configured to distinguish between and among a plurality of connection options specified by said plurality of competing system clients and to grant said connection in accordance with the specified connection options.

14. The apparatus of claim 13 wherein said connection rules specify whether said one or more of said plurality of competing system clients will yield said connection when requested.

15. The apparatus of claim 13 wherein said connection is initially created in a dormant state and then is subsequently upgraded to an active state whenever said connection is granted.

16. The apparatus of claim 13 wherein said means for granting notifies said one or more of said plurality of competing system clients whenever said connection is granted.

17. An apparatus for arbitrating access to a selected device in a computer system, comprising:

a routine for registering connection rules for accessing said selected device;

a plurality of competing system clients each requesting a connection to said selected device; and an arbitrator for granting said connection to selected ones of said plurality of competing system clients based upon said registered connection rules;

wherein said routine includes a discrete access point which is registered to connect said selected ones of said plurality of said competing system clients with said selected device.

18. A method for arbitrating access to a selected system device in a computer system, comprising the steps of:

registering connection rules for accessing said selected device;

requesting a connection to said selected device for a plurality of competing system clients; and granting said connection to one or more of said plurality of competing system clients based upon said registered connection rules;

wherein said step of registering is performed by a routine which also registers an ownership relationship between said routine and said selected device.

19. A computer-readable medium containing instructions which cause a computer system to arbitrate access to a selected device by performing the steps of:

registering connection rules for accessing said selected device;

requesting a connection to said selected device for a plurality of competing system clients; and granting said connection to one or more of said plurality of competing system clients based upon said registered connection rules;

wherein said step of registering is performed by a routine which also registers an ownership relationship between said routine and said selected device.

20. An apparatus for arbitrating access to selected computer system devices, comprising:

means for registering connection rules for accessing said selected device;

means for requesting a connection to said selected device for a plurality of competing system clients; and means for granting said connection to one or more of said plurality of competing system clients based upon said registered connection rules;

wherein said means for registering includes a discrete access point which is registered to connect said selected ones of said plurality of said competing system clients with said selected device.

* * * * *

UNITED STATES PATENT AND TRADEMARK OFFICE
CERTIFICATE OF CORRECTION

PATENT NO : 5,835,737

DATED : November 10, 1998

INVENTOR(S) : Sand, et al.

It is certified that error appears in the above-identified patent and that said Letters Patent is hereby corrected as shown below:

In the claims:

In Claim 1, at column 7, line 56, delete "rule," and insert --rules,--.

In Claim 8, at column 8, line 26, delete "claim 6" and insert --claim 5--.

Signed and Sealed this

Twenty-second Day of June, 1999

Attest:

Q. TODD DICKINSON

*Attesting Officer*    *Acting Commissioner of Patents and Trademarks*